May 31, 1960  R. A. HUTCHINGS ET AL  2,938,307
LENS GRINDING MEANS
Filed May 23, 1958  8 Sheets-Sheet 4

Inventors
Robert A. Hutchings,
Howard J. Schwichtenberg
and Henry J. Bubley
By Robert F. Miehle, Atty.

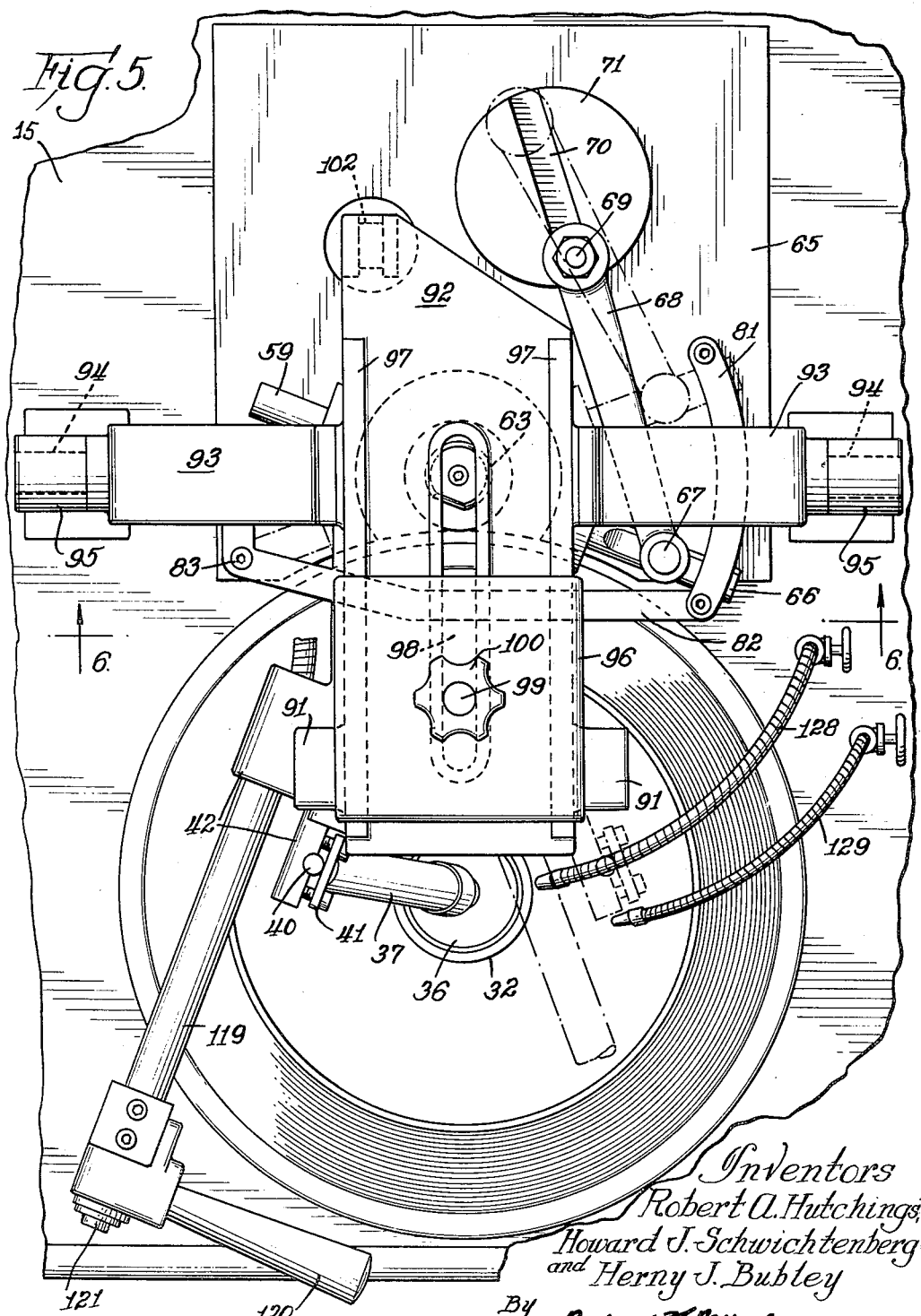

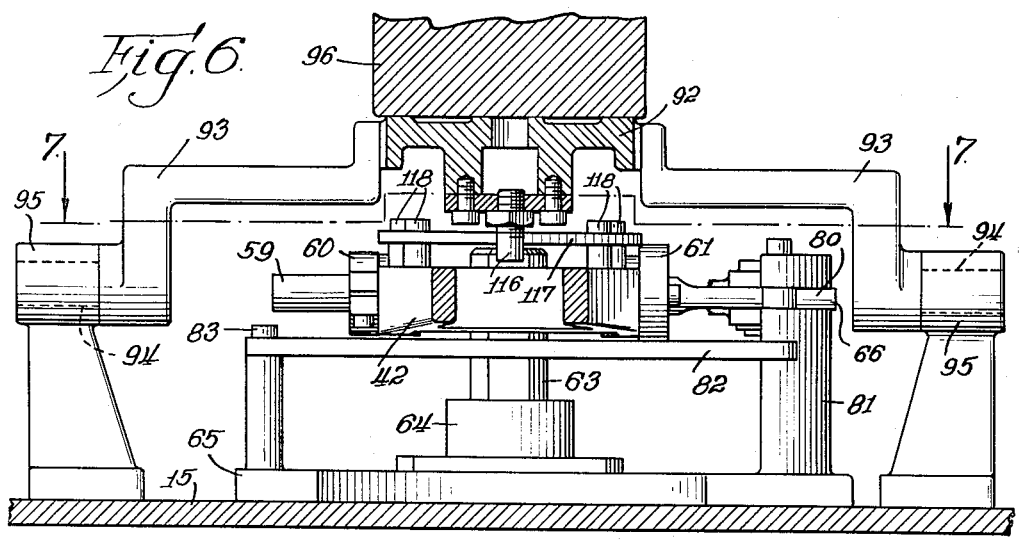

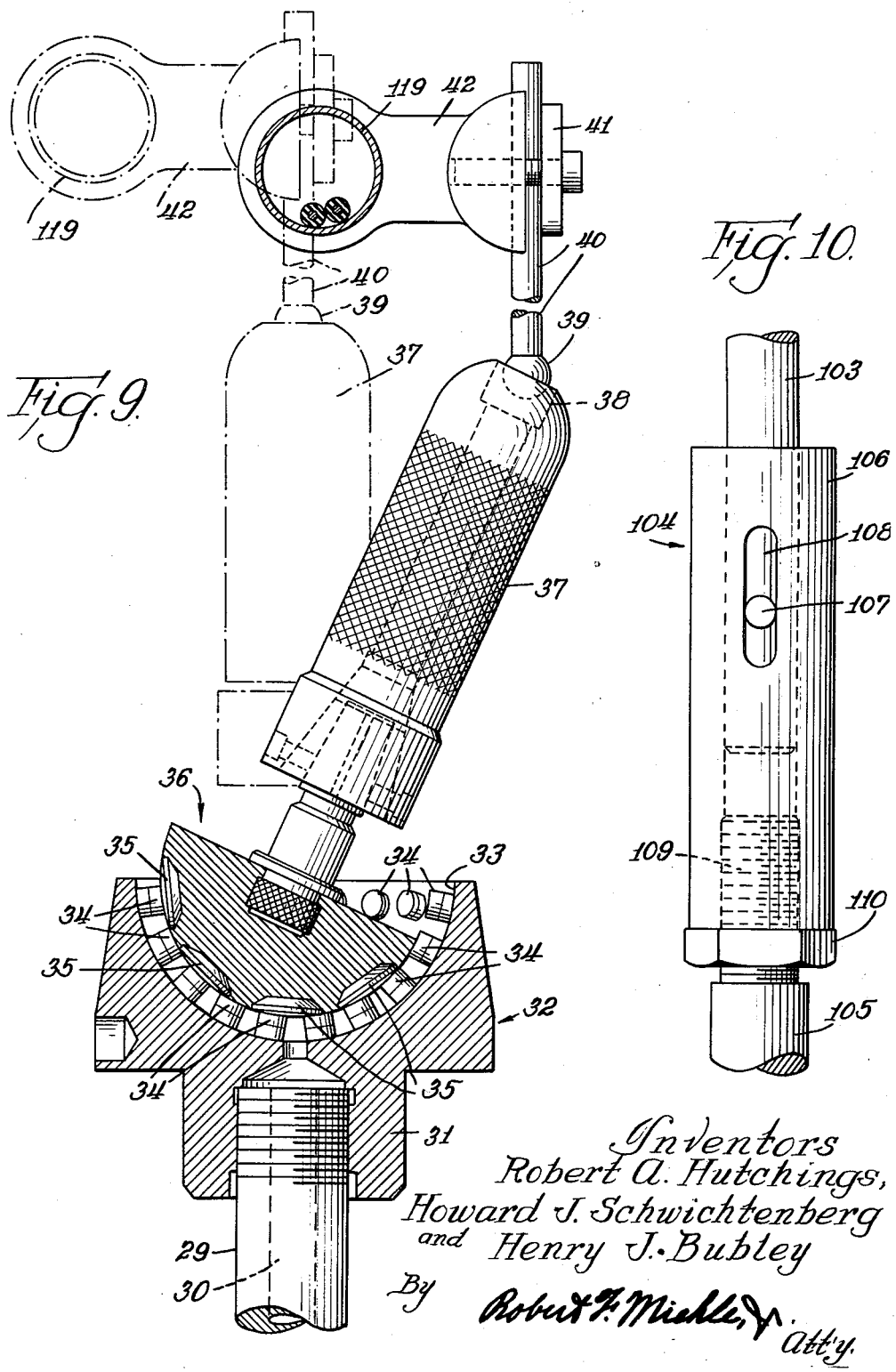

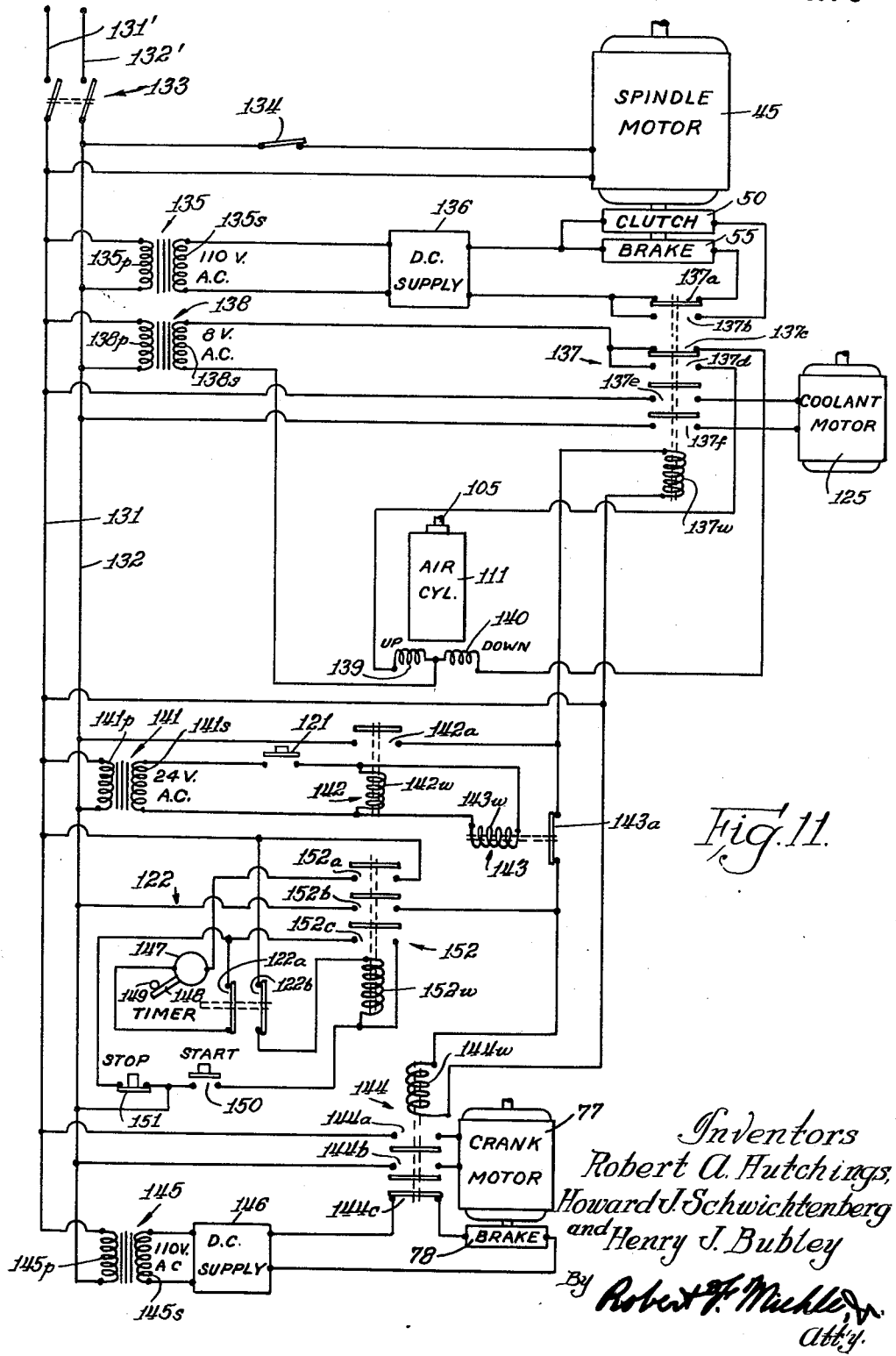

United States Patent Office 2,938,307
Patented May 31, 1960

2,938,307
LENS GRINDING MEANS

Robert A. Hutchings, Arlington Heights, Howard J. Schwichtenberg, Des Plaines, and Henry J. Bubley, Skokie, Ill., assignors to Bell & Howell Company, Chicago, Ill., a corporation of Illinois Filed May 23, 1958, Ser. No. 737,321
14 Claims. (Cl. 51—124)

This invention relates, generally, to means for grinding lenses and it has particular relation to mechanisms for grinding lenses for use in photographic apparatus and the like.

Among the objects of this invention are: To provide mechanism for grinding lenses that is simple and efficient in operation and can be readily and economically manufactured and installed; to maintain substantially constant pressure between the surface of the lens or lenses being ground and the lens grinding means in a new and improved manner; to apply the pressure by the biasing action of a weight that acts only in a vertical plane; to transmit the biasing action to the surface of the lens or lenses being ground regardless of the angular relationship between such surface and the lens grinding means; to transmit the biasing action to a pair of transversely related rollers; to rotate either the lens grinding means or the lens or lenses being ground about a vertical axis while the lens or lenses being ground or the lens grinding means are being arcuately oscillated and grinding pressure is applied; to provide separate driving means for rotating the lens grinding means or the lens or lenses being ground and for arcuately oscillating the lens or lenses being ground or the lens grinding means; to provide a third driving means for lowering and lifting the weight; and to operate the separate driving means, above referred to, simultaneously for a predetermined interval and thereafter the third driving means to terminate the grinding operation and permit removal of the ground lens or lenses.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following detailed description, taken together with the accompanying drawings, in which:

Figure 5 is a top plan view, at an enlarged scale, of the top portion of the machine;

Figure 6 is a vertical sectional view taken generally along the line 6—6 of Figure 5;

Figure 7 is a horizontal sectional view taken generally along the line 7—7 of Figure 6;

Figure 9 is a vertical sectional view taken generally along the line 9—9 of Figure 7;

Figure 10 is a view, in side elevation, and at an enlarged scale, of an adjustable connection employed in the machine and shown in Figure 2; and Figure 11 illustrates diagrammatically the electric circuit connections that can be employed in practicing this invention.

Figure 1:
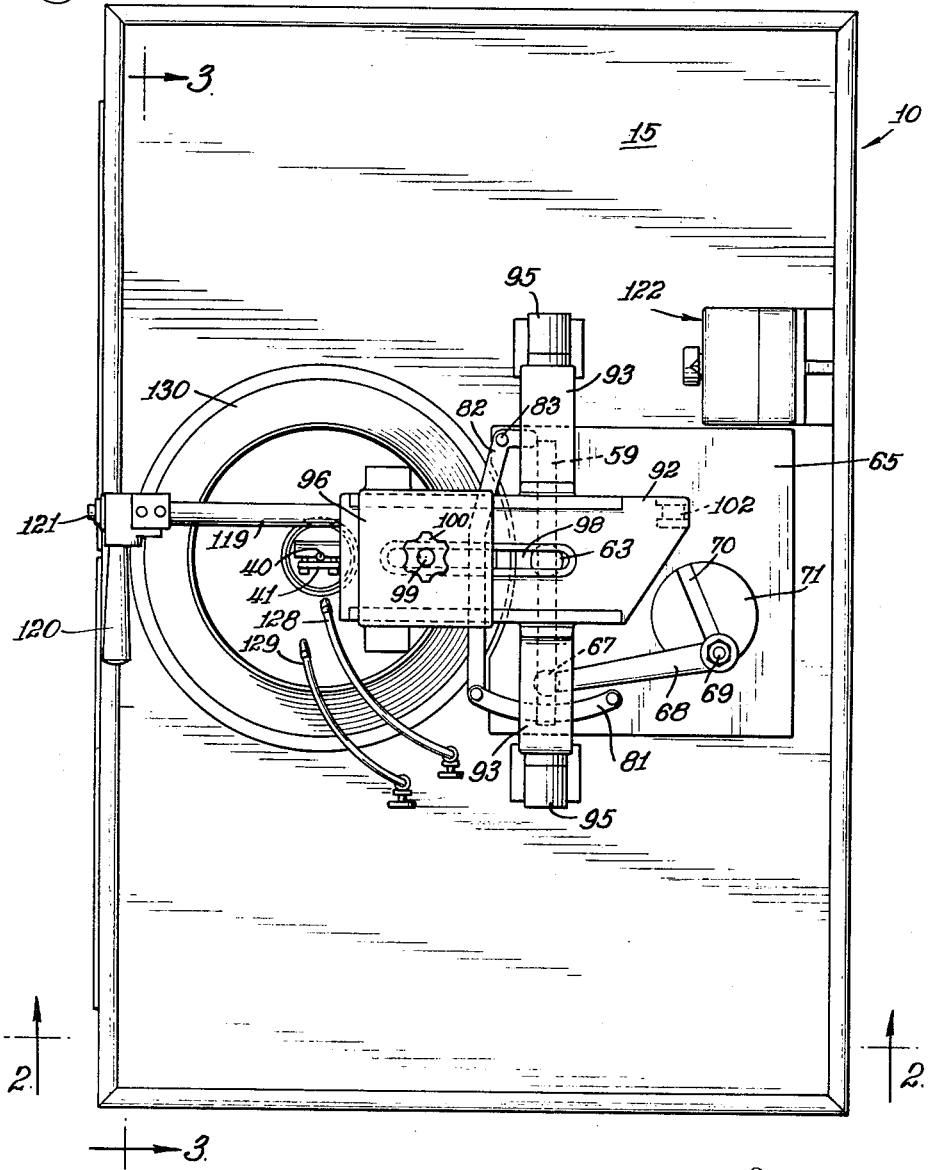
Figure 1 is a top plan view of a lens grinding machine in which the present invention is embodied.
Figure 2:
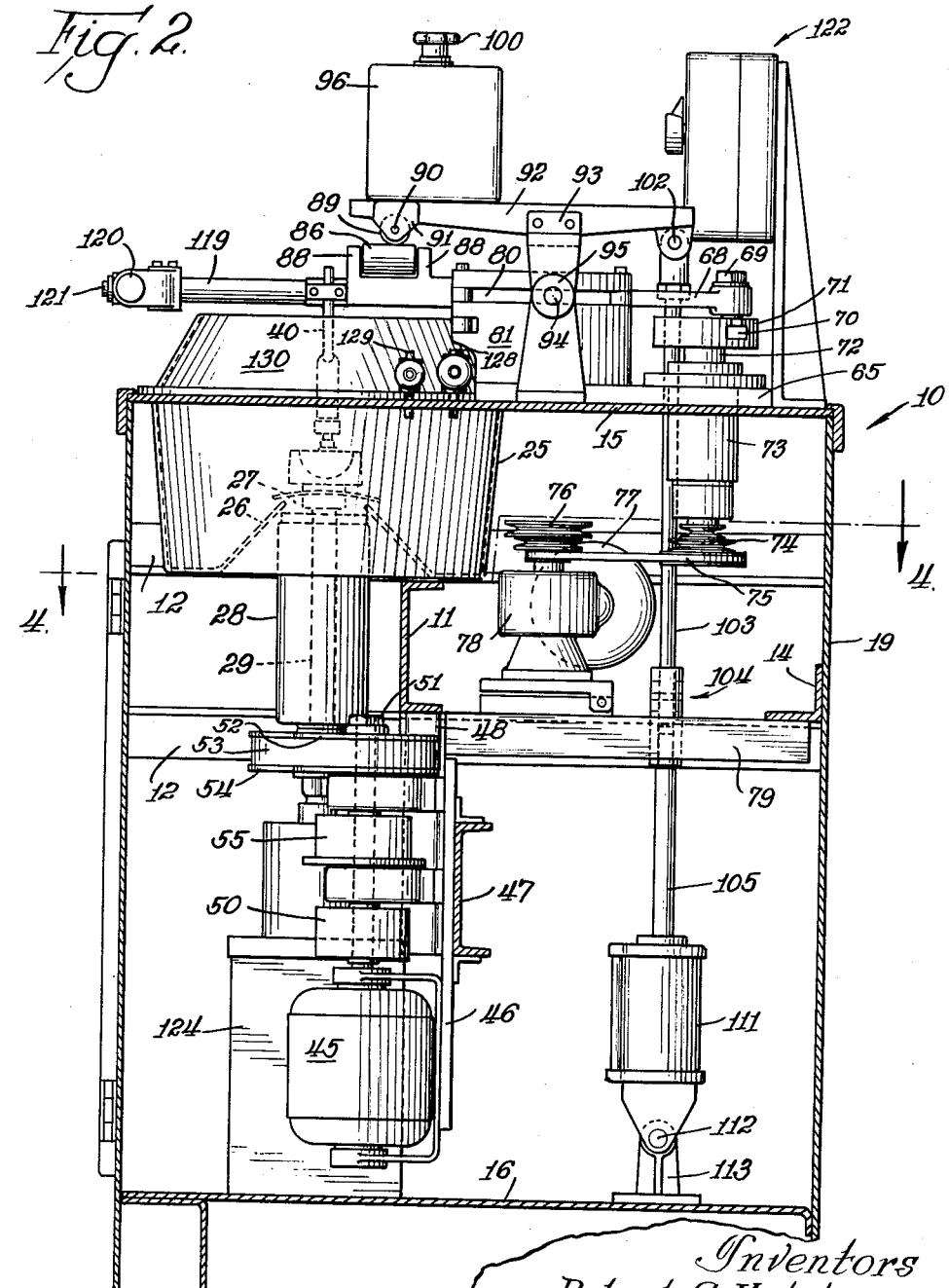
Figure 2 is a vertical sectional view taken generally along the line 2—2 of Figure 1.
Figure 3:
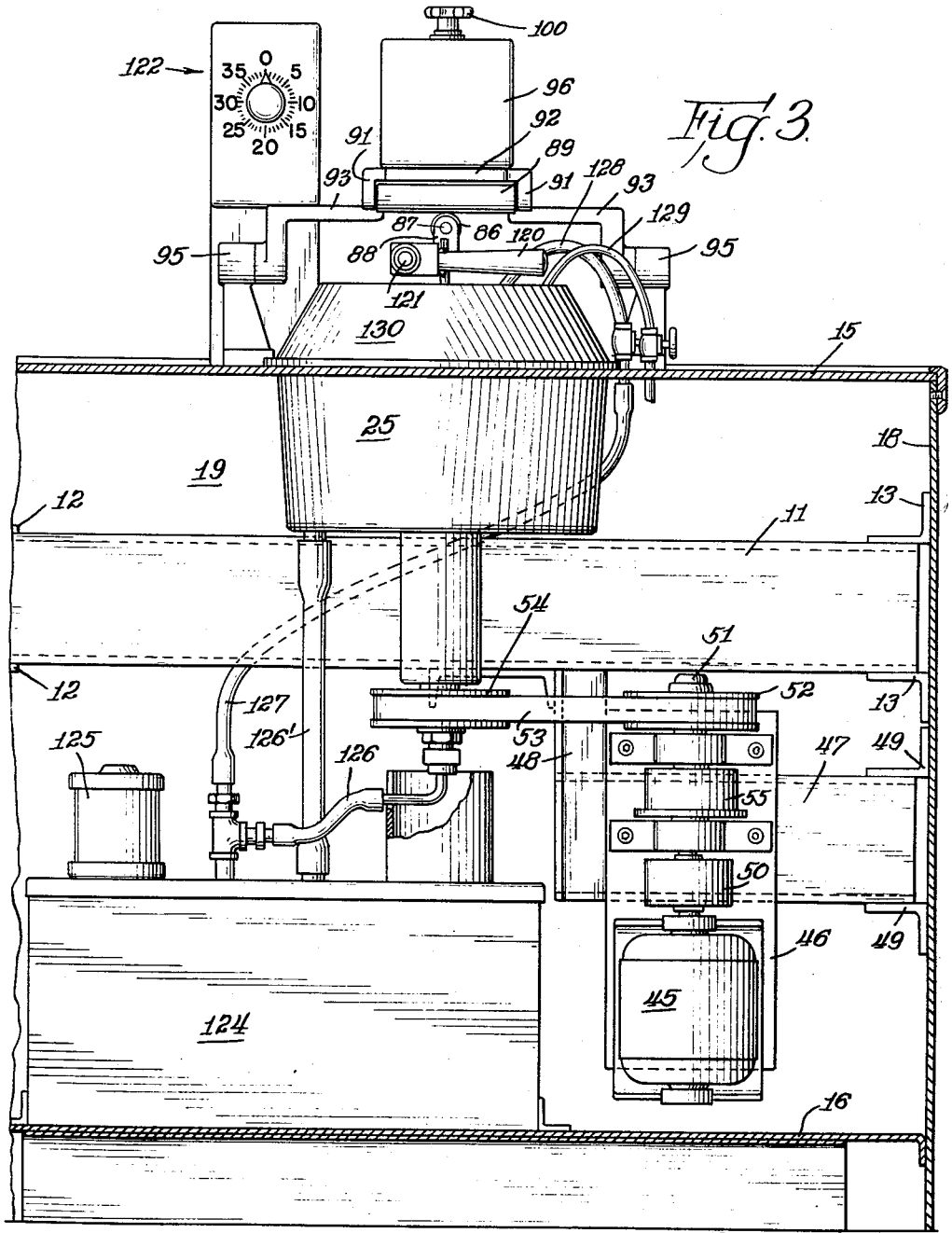
Figure 3 is a vertical sectional view taken generally along the line 3—3 of Figure 1.
Figure 4:
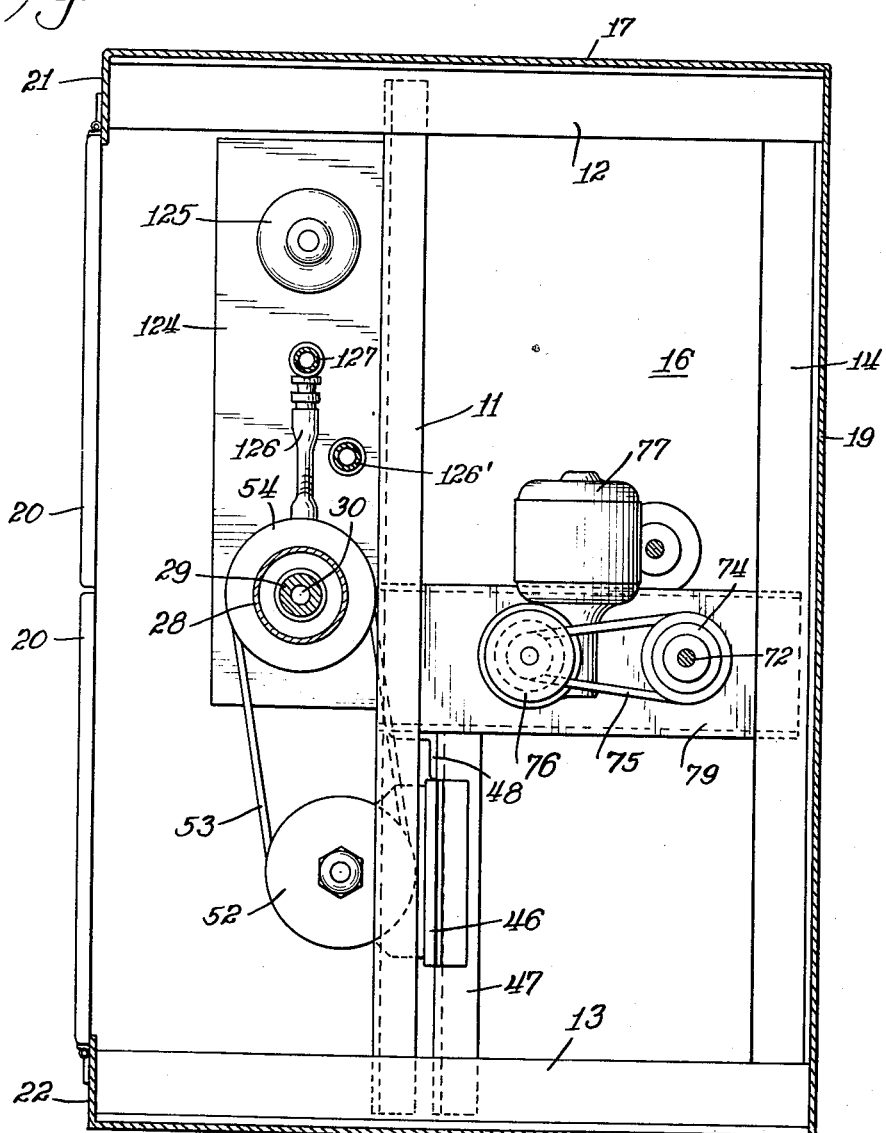
Figure 4 is a horizontal sectional view taken generally along the line 4—4 of Figure 2.

Referring now particularly to Figures 1, 2, 3 and 4 of the drawings, it will be observed that the reference character 10 designates, generally, a frame which is formed of structural members and steel plate on which the various machine parts referred to hereinafter are mounted to provide a unitary construction. Only as much of the frame 10 will be described in detail as appears to be necessary for an understanding of the invention, it being understood that many forms of frame construction can be employed. The frame 10 includes an upper channel member 11, Figure 2, which extends, as shown in Figures 3 and 4, between side angle members 12 and 13. The frame also includes a transverse angle member 14 and a sheet steel enclosure which includes a top plate 15, a bottom plate 16, and end plates 17 and 18 together with a back plate 19. Doors 20 are hinged to extensions 21 and 22 from the end plates 17 and 18 to permit access to the interior of the enclosure.

The lens grinding operation is carried out in a pan 25 which is carried by the top plate 15. The pan 25 has a conical bottom portion 26 that is provided with a central opening 27 with which a sleeve 28 registers. Rotatably mounted within the sleeve 28 is a hollow vertical shaft or spindle 29 which, as shown more clearly in Figure 9 of the drawings, is provided with a central opening 30 through which a coolant can be circulated in a manner to be described hereinafter. In the claims the hollow vertical shaft 29 is referred to as a first shaft. It will be observed that the upper end of the shaft 29 is threaded into a depending boss 31 of a lens grinding member or grinding tool that is indicated, generally, at 32. The tool 32 has a hemispherical surface 33 for receiving grinding elements 34 that preferably are in the form of diamond pellets. Figure 9 shows an arrangement for grinding convex lenses 35. It will be observed that the convex lenses 35 are secured to a lens holding member or lens blocker that is indicated, generally, at 36. A handle 37 is secured centrally to the lens blocker 36 and extends upwardly therefrom. At its upper end the handle 37 has a cavity 38 which receives a ball tip 39 of a poker rod 40 which is clamped at 41 to the distal end of a poker rod support arm 42. As will be described hereinafter, provision is made for rotating the shaft 29 about its vertical axis to effect a corresponding rotation of the grinding tool 32. At the same time provision is made for oscillating the poker rod support arm 42 about both vertical and horizontal axes to effect a combined rocking and rotary movement of the lens blocker 36 and the lens or lenses 35 carried thereby.

As pointed out, the arrangement shown in Figure 9 is employed for grinding convex lenses 35. When it is desired to grind concave lenses, the relationship between the grinding tool 32 and lens blocker 36 is reversed. That is to say, the lens blocker 36, carrying lenses to be concavely ground, is mounted for rotation with the shaft 29 about its vertical axis and the grinding tool 32, appropriately shaped with a convex grinding surface, is arranged to be operated by the poker rod 40.

Referring now particularly to Figures 2 and 3 of the drawings, it will be observed that a spindle motor 45 is provided for rotating the hollow vertical shaft or spindle 29. The spindle motor 45, which constitutes the first driving means referred to in the claims, is mounted on a plate 46 which is carried by a lower channel member 47 which extends between a frame angle 48, depending from the upper channel member 11 and angle members 49 which extend along the end plate 18. A magnetic clutch 50 is provided for placing the motor 45 in driving connection with the shaft 29. The driving connection from the clutch 50 to the shaft 29 is through a shaft 51 which carries a pulley 52 over which a belt 53 is trained. The belt 53 also is trained over a pulley 54 that is secured to the lower end of the hollow shaft 29. The shaft 51 also is provided with a magnetic brake 55 which, when energized, stops further rotation of the shaft 51 and through the belt 53 likewise stops further rotation of the shaft 29.

Referring particularly to Figure 7 of the drawings, it will be observed that the poker rod support arm 42 is provided at its rotating end with arms 58 through which a horizontal shaft 59 extends. The arms 58 are arranged to rotate through an arc relative to the horizontal shaft 59. Stops 60 and 61, secured to the horizontal shaft 59 hold the arms 58 and thereby the poker rod support arm 42 in the desired position. The horizontal shaft 59 is journaled at 62 in the upper end of a vertical shaft 63 which is referred to in the claims as a second shaft. As shown in Figure 6 the lower end of the vertical shaft 63 is journaled in a bearing 64 that is mounted on a plate 65 which is carried by the top plate 15 of the frame 10. By mounting the poker rod support arm 42 for rotation on the horizontal shaft 59, the poker rod support arm 42 can rotate about the horizontal axis of the shaft 59. Since the horizontal shaft 59 is carried by the vertical shaft 63, which is arranged to be oscillated about a vertical axis, the poker rod support arm 42 can also move about this axis. Thus it has two degrees of motion, one about a horizontal axis and the other about a vertical axis.

With a view to rotating the poker rod support arm 42 about the vertical axis through a limited extent one end 66 of the horizontal shaft 59 is pivotally connected at 67 to an eccentric link 68. As shown more clearly in Figure 5 the other end of the eccentric link 68 is connected to an eccentric pin or bolt 69 that is adjustable in a slot 70 of an eccentric 71. By changing the position of the eccentric pin or bolt 69 in the slot 70, the extent of movement of the poker rod support arm 42 about the vertical axis of the shaft 63 can be adjusted.

As shown in Figure 2 provision is made for rotating the eccentric 71. Here it will be observed that the eccentric 71 is fastened to the upper end of a shaft 72 which is journaled in a bearing 73 that is carried by the plate 65. At its lower end the shaft 72 is provided with a stepped pulley 74 that is driven by a belt 75 from a stepped pulley 76 which, in turn, is driven by a crank motor 77 which constitutes the second driving means referred to in the claims. A magnetic brake 78 cooperates with the crank motor 77 for stopping further rotation thereof and further rotation of the eccentric 71 in a manner to be described hereinafter. The crank motor 77 and magnetic brake 78 are mounted on a platform 79 which extends between the underside of upper channel member 11 and the transverse angle member 14 of the frame 10. Referring to Figures 2 and 6 of the drawings, it will be observed that the end 66 of the horizontal shaft 59 is guided in its arcuate oscillatory movement in a slot 80 that is provided in an arcuate guide 81 which is carried by the plate 65. Extending from the outer end of the arcuate guide 81 is an arm 82 and it is secured at 83 to the plate 65. The arm 82 limits the downward movement of the poker rod support arm 42 in the absence of the poker rod 40 and parts associated therewith which are shown in Figure 9.

It is desirable to apply a predetermined force to the surfaces of the lenses 35 being ground. While this force must be transmitted through the poker rod 40 and poker rod support arm 42, it is undesirable to provide the required force by increasing the weight of the poker rod support arm 42. One reason for this is that the poker rod support arm 42, in addition to rotating about a horizontal axis while the grinding operation is being performed, also is oscillated about a vertical axis. If the required weight were applied directly to the poker rod support arm 42, it would be necessary to accelerate and decelerate the entire mass during the oscillatory movement of the poker rod support arm 42 about the vertical axis.

Figure 8:
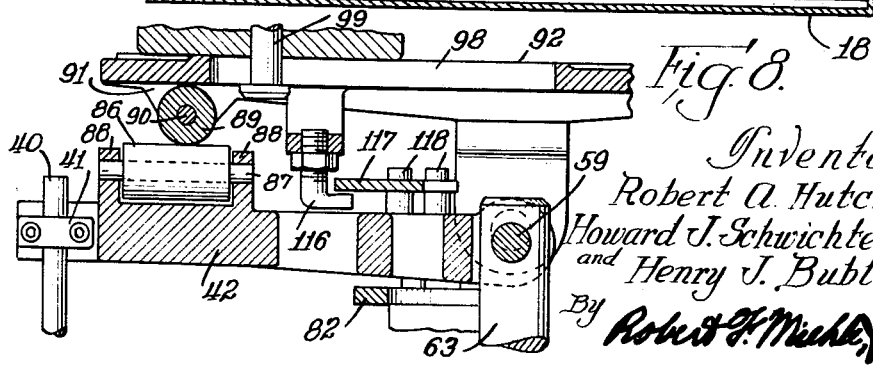
Figure 8 is a vertical sectional view taken generally along the line 8—8 of Figure 7.

In accordance with this invention provision is made for applying the necessary force which acts only in a vertical plane. With this in mind an elongated roller 86, Figure 8, is provided at the distal end of the poker rod support arm 42. The elongated roller 86 extends lengthwise of the poker rod support arm 42 and includes a shaft 87 which is journaled in upstanding arms 88. Cooperating with the elongated roller 86 on the poker rod support arm 42 is another elongated roller 89 which extends transversely thereof. It includes a shaft 90 which is journaled in depending arms 91, Figure 2, from a rocker lever 92 which is arranged to rotate only about a horizontal axis. The rocker lever 92, Figure 5, is provided with depending brackets 93 on opposite sides which have outstanding trunnions 94 that are journaled in bearings 95 which are carried by the top plate 15 of the frame 10. The necessary downward force is provided by a weight 96, the size of which can be varied as will be understood readily. The weight 96 slides on ways 97 which are provided on the upper side of the rocker lever 92. Centrally of the rocker lever 92 is a slot 98, Figure 8, through which a clamp bolt 99 extends. A clamp nut 100 at the upper end of the clamp bolt 99 serves to hold the weight 96 in the desired position on the rocker lever 92. By changing the size of the weight 96 and by adjusting its position on the rocker lever 92, a wide range of force can be exerted downwardly through the rollers 89 and 86 onto the poker rod 40.

It is desirable that provision be made for mechanically rocking the rocker lever 92 at the beginning and at the end of the grinding operation in order to shift it out of the way and permit the substation of another lens blocker 36 carrying a new set of convex lenses 35 to be ground. For this purpose the end of the rocker lever 92 opposite the end where the weight 96 is located is pivotally connected at 102 to the upper end of a control rod 103, Figure 2, which is connected through an adjustable connection 104 to a piston rod 105. The details of construction of the adjustable connection 104 are shown in Figure 10. It will be observed that the lower end of the control rod 103 is slidable within the upper end of a sleeve 106. This is desirable since the rocker lever 92 rotates about the horizontal axis of the trunnions 94 as the poker rod support arm 42 is oscillated about the vertical axis of the shaft 63. A pin 107 extends transversely of the control rod 103 and through an elongated slot 108 in the sleeve 106. The length of the slot 108 is sufficient to take care of any rocking movement to which the rocker lever 92 may be subjected. At its lower end the sleeve 106 is threaded onto the upper end of the piston rod 105 and a lock nut 110 is provided for securing them in position.

Referring to Figure 2 it will be observed that the piston rod 105 extends from an air cylinder 111. By controlling the supply of compressed air to the air cylinder 111 it is possible to raise and lower the piston rod 105. This will be described hereinafter. The air cylinder 111 is rockably mounted at 112 on a bracket 113 which is carried by the bottom plate 16. The air cylinder 111 together with the piston rod 105 constitutes the third driving means referred to in the claims.

At the time that the rocker lever 92 is rocked to lift the weight 96 at the termination of a grinding operation, it is desirable that the poker rod support arm 42 also be lifted. For this purpose, as shown in Figure 8, a lift lug 116 depends from the rocker lever 92 and extends underneath a plate 117 which is secured at 118 to the upper side of the poker rod support arm 42 as is shown more clearly in Figure 7 of the drawings.

Extending outwardly from the distal end of the poker rod support arm 42, as shown in Figures 5 and 7 of the drawings, is a poker pin arm 119 which is provided at its outer end with a transversely extending handle 120. This permits manual raising and lowering of the poker rod support arm 42 and the weight 96 where such action is required. A starting push button 121 is located at the outer end of the poker pin arm 119 for initiating certain operations to be described.

The grinding cycle is controlled by a timer that is shown generally at 122 in Figures 1, 2 and 3 of the drawings. The manner in which the timer 122 controls the cycle of operations will be set forth hereinafter in connection with a description of the circuit connections shown in Figure 11.

Since considerable heat is developed during the grinding operation, it is desirable that means be provided for dissipating the heat rapidly. For this purpose, as shown in Figure 3, a coolant tank 124 is mounted on the bottom plate 16. The coolant is circulated by a coolant motor 125 which drives a pump in conventional manner to circulate the coolant through a conduit 126 so as to flow through the central opening 30 in the shaft 29, previously referred to. By reference to Figure 9 it will be observed that the central opening 30 communicates with the interior of the grinding tool 32 with the result that the coolant forced upwardly through the shaft 29 flows over the surfaces of the lenses 35 being ground and over the upper edge of the grinding tool 32. The coolant is collected in the pan 25 and returned through a conduit 126' to the coolant tank 124. The coolant also is caused to flow through a conduit 127 to a spray nozzle 128 whence it can be directed over the top of the lens blocker 36 as may be desired.

After the grinding operation has been completed, compressed air from an air nozzle 129 can be directed onto lens blocker 36 for removing all traces of the coolant. A splash guard 130 overlies the pan 25 to prevent splashing of the coolant.

Figure 11 of the drawings shows the circuit connections that can be employed in practicing this invention. It will be observed that conductors 131 and 132 are provided which can be connected by a double pole, single throw switch 133 to energized conductors 131' and 132' respectively. Preferably the conductors 131' and 132' are energized from a 230 volt 60 cycle source of alternating current. The spindle motor 45 is connected directly across the conductors 131 and 132 and an emergency switch 134 is interposed in this circuit for deenergizing the spindle motor 45 independently of opening of the line switch 133.

The clutch 50 and brake 55 for the spindle motor 45 are energized with direct current that is obtained from a transformer that is shown, generally, at 135. The transformer 135 includes a primary winding 135p which is connected across the conductors 131 and 132. It also includes a secondary winding 135s which is connected to a rectifier 136 which supplies the necessary direct current for energizing the clutch 50 and brake 55.

The clutch 50 and brake 55 and the coolant motor 125 are controlled by a motor control relay 137. The motor control relay 137 is provided with normally closed and open contacts 137a and 137f and is arranged to be operated by a winding 137w.

In order to control the flow of air to the air cylinder 111 a transformer, shown generally at 138, is employed. It includes a primary winding 138p connected for energization across the conductors 131 and 132 and a secondary winding 138s which is arranged, in conjunction with contacts 137c and 137d, of motor control relay 137, to control energization of up and down air cylinder control windings 139 and 140. It will be understood that, when winding 139 is energized, air is admitted to the air cylinder 111 to cause the piston rod 105 to move upwardly and lower the weight 96 and that on energization of the winding 140 the reverse operation takes place.

A control transformer, shown generally at 141, is provided in conjunction with the push button 121. It includes a primary winding 141p that is connected for energization across the conductors 131 and 132 and a secondary winding 141s which is connected through the push button 121 to energize a winding 142w of a start relay that is shown, generally, at 142. The start relay 142 includes normally open contacts 142a. A winding 143w of an auxiliary relay, shown generally at 143, is connected in parallel circuit relation with the winding 142w and is arranged to control the operation of normally closed contacts 143a.

The crank motor 77, which rotates the eccentric 71, is controlled by a crank motor relay that is shown, generally, at 144. This relay includes an operating winding 144w that is arranged to be energized in parallel with the operating winding 137w under certain conditions. It also includes normally open contacts 144a and 144b for energizing the crank motor 77 and normally closed contacts 144c for controlling the energization of the magnetic brake 78. Direct current for energizing the brake 78 is obtained from a transformer that is shown, generally, at 145. It has a primary winding 145p that is connected for energization across the conductors 131 and 132 and a secondary winding 145s which is connected to energize a rectifier 146.

The timer 122, previously referred to, is shown diagrammatically in Figure 11 and it includes a timer motor 147 which is arranged to rotate an arm 148 from an initial position against a stop 149 to open contacts 122a and 122b at the end of the time interval for which the timer 122 may be set.

A start push button 150 and a stop push button 151 are provided for controlling the operation of a control relay that is shown, generally, at 152. This relay includes an operating winding 152w and normally open contacts 152a, b and c.

In describing the operation of the lens grinding machine described hereinbefore and shown in the drawings, it will be assumed that the grinding tool 32 is arranged, as shown in Figure 9, to grind convex surfaces on convex lenses 35 which are mounted on a lens blocker 36. Also, it will be assumed that the rocker lever 92 is in the position in which the weight 96 is raised. Also, it will be assumed that the stop 149 of the timer 122 has been adjusted to provide the desired time interval for operation of the timer motor 147 and that the conductors 131 and 132 are energized by closure of the line switch 133. Under these conditions the brake 55 is energized for the spindle motor 45 and the winding 140 for controlling the air cylinder 111 is energized. Also, the brake 78 for the crank motor 77 is energized.

The operator then momentarily depresses the push button 121 located at the end of the poker pin arm 119. Obvious circuits are completed for energizing windings 142w and 143w of the start relay 142 and auxiliary relay 143 respectively. At contacts 143a the circuit is opened to prevent energization of the crank motor 77 and of the timer motor 147. At contacts 142a an energizing circuit for the operating winding 137w is completed and the contacts of the motor control relay 137 are opened and closed as the case may be. The opening of contacts 137c deenergizes air cylinder control winding 140 while closure of contacts 137d completes a circuit for energizing the air cylinder control winding 139. As a result the piston rod 105 is moved upwardly and the rocker lever 92 is rotated in a counterclockwise direction as viewed in Figure 2 to bring the weight 96 to the position here shown and permitting the downward movement of the poker rod support arm 42 to the position shown in Figure 9 where the handle 37 is held in engagement with the poker rod 40.

The energization of the operating winding 137w opens contacts 137a to deenergize the brake 55 and closes contacts 137b to energize the clutch 50. The spindle motor 45 then is placed in driving connection with the shaft 29 and the grinding tool 32 rotates about a vertical axis. At contacts 137e and 137f an energizing circuit for the coolant motor 125 is completed and the coolant begins to flow in the manner previously described.

The operator now depresses the start button 150 to initiate the timing cycle and releases the push button 121. Operating winding 152w of control relay 152 then is energized through normally closed contacts 122b of the timer 122. At contacts 152c a holding circuit is provided for the winding 152w so that the start button 150 can be released. The release of push button 121 permits deenergization of operating windings 142w and 143w. Contacts 142a are opened but contacts 143a are closed and a holding circuit for the operating winding 137w is completed through contacts 152b of the control relay 152. At this time operating winding 144w of the crank motor relay 144 is energized, contacts 144c are opened to deenergize the magnetic brake 78 and contacts 144a and 144b are closed to energize the crank motor 77. The eccentric 71 now is rotated and the poker rod support arm 42 is rocked about both vertical and horizontal axes to effect a corresponding movement of the lens blocker 36 while the shaft 29 continues to rotate the grinding tool 32.

The weight 96 moves in a vertical plane about the horizontal axis of rotation through the pinions 94 and the downward force thereof is transmitted to the rollers 89 and 86, to the poker rod support arm 42 and thence through the poker rod 40 and handle 37 to the lens blocker 36 and lenses 35 carried thereby.

At contacts 152a a circuit is completed on energization of the control relay 152 for energizing the timer motor 147. It begins to move the arm 148 away from the stop 149.

The operation, as described, continues and the convex surfaces of the lens 35 are ground for a time interval depending upon the setting of the timer 122. At the end of that interval, the arm 148 moves the timer contacts 122a and 122b to the open position. The opening of contacts 122b effects deenergization of the operating winding 152w of the control relay 152 and its contacts are opened. The opening of contacts 152b opens the holding circuit for operating windings 137w and 144w. Relays 137 and 144 are deenergized. The clutch 50 for the spindle motor 45 is deenergized to disconnect the spindle motor 45 from driving connection with the shaft 51 and the brake 55 is energized to stop rotation of the shaft spindle 29 and therewith further rotation of the grinding tool 32. The coolant motor 125 is deenergized and the circulation of the coolant ceases. The crank motor 77 is deenergized on deenergization of relay 144 and brake 78 is energized to stop further rotation of the eccentric 71 and movement of the poker rod support arm 42.

At contacts 152a the energizing circuit for the timer motor 147 is opened and the arm 148 returns to the initial position against the stop 149.

The cycle can be repeated as may be required.

The stop push button 151 is provided to interrupt the holding circuit for the operating winding 152w in the event that such action is desired prior to the time that it is accomplished by opening of timer contacts 122b in the manner described.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. Lens grinding means comprising, in combination, a lens grinding member, a lens holding member for carrying one or more lenses in grinding relation to said lens grinding member, a frame, a first shaft mounted on said frame for rotation about a vertical axis with one of said members mounted on its upper end for rotation therewith, a first driving means for rotating said first shaft about said vertical axis, poker rod means connected to and extending upwardly from the other of said members, a poker rod support arm secured at its distal end to the upper end of said poker rod means, a horizontal shaft at the other end of said support arm mounting said support arm for rotation about a horizontal axis, a second shaft mounted on said frame for rotation about a vertical axis and rotatably carrying said horizontal shaft whereby said support arm and said poker rod means carried thereby are movable simultaneously about horizontal and vertical axes, a second driving means connected to said horizontal shaft for arcuately reciprocating it about the vertical axis of said second shaft, a rocker lever mounted on said frame above said support arm for rotation about a horizontal axis, means interconnecting said rocker lever and said support arm, and weight means biasing said rocker lever toward said support arm to maintain grinding pressure on said lens or lenses.

2. Lens grinding means comprising, in combination, a lens grinding member, a lens holding member for carrying one or more lenses in grinding relation to said lens grinding member, a frame, a first shaft mounted on said frame for rotation about a vertical axis with one of said members mounted on its upper end for rotation therewith, a first driving means for rotating said first shaft about said vertical axis, poker rod means connected to and extending upwardly from the other of said member, a poker rod support arm secured at its distal end to the upper end of said poker rod means, a horizontal shaft at the other end of said support arm mounting said support arm for rotation about a horizontal axis, a second shaft mounted on said frame for rotation about a vertical axis and rotatably carrying said horizontal shaft whereby said support arm and said poker rod means carried thereby are movable simultaneously about horizontal and vertical axes, a second driving means connected to said horizontal shaft for arcuately reciprocating it about the vertical axis of said second shaft, an elongated roller rotatably mounted on the upper side of said support arm at said distal end, a rocker lever mounted on said frame above said support arm for rotation about a horizontal axis, an elongated roller rotatably mounted on the under side and at one end of said rocker lever transversely of and engaging said roller on said support arm in any position to which said support arm is reciprocated, and weight means biasing said rocker lever and roller carried thereby toward said support arm and roller carried thereby to maintain grinding pressure on said lens or lenses.

3. Lens grinding means comprising, in combination, a lens grinding member, a lens holding member for carrying one or more lenses in grinding relation to said lens grinding member, a frame, a first shaft mounted on said frame for rotation about a vertical axis with one of said members mounted on its upper end for rotation therewith, a first driving means for rotating said first shaft about said vertical axis, poker rod means connected to and extending upwardly from the other of said members, a poker rod support arm secured at its distal end to the upper end of said poker rod means, a horizontal shaft at the other end of said support arm mounting said support arm for rotation about a horizontal axis, a second shaft mounted on said frame for rotation about a vertical axis and rotatably carrying said horizontal shaft whereby said support arm and said poker rod means carried thereby are movable simultaneously about horizontal and vertical axes, a second driving means connected to said horizontal shaft for arcuately reciprocating it about the vertical axis of said second shaft, an elongated roller rotatably mounted on the upper side of said support arm and extending longitudinally thereof at said distal end, a rocker lever mounted on said frame above said support arm for rotation about a horizontal axis, an elongated roller rotatably mounted on the under side and at one end and transversely of said rocker lever and engaging said roller on said support arm in any position to which said support arm is reciprocated and weight means biasing said rocker lever and roller carried thereby toward said support arm and roller carried thereby to maintain grinding pressure on said lens or lenses.

4. Lens grinding means comprising, in combination, a lens grinding member, a lens holding member for carrying one or more lenses in grinding relation to said lens grinding member, a frame, a first shaft mounted on said frame for rotation about a vertical axis with one of said members mounted on its upper end for rotation therewith, a first driving means for rotating said first shaft about said vertical axis, poker rod means connected to and extending upwardly from the other of said members, a poker rod support arm secured at its distal end to the upper end of said poker rod means, a horizontal shaft at the other end of said support arm mounting said support arm for rotation about a horizontal axis, a second shaft mounted on said frame for rotation about a vertical axis and rotatably carrying said horizontal shaft whereby said support arm and said poker rod means carried thereby are movable simultaneously about horizontal and vertical axes, a second driving means connected to said horizontal shaft for arcuately reciprocating it about the vertical axis of said second shaft, an elongated roller rotatably mounted on the upper side of said support arm and extending longitudinally thereof at said distal end, a rocker lever mounted on said frame above said support arm for rotation intermediate its ends about a horizontal axis, an elongated roller rotatably mounted on the under side and at one end and transversely of said rocker lever and engaging said roller on said support arm in any position to which said support arm is reciprocated, weight means on said one end of said rocker lever and movable therewith only about its horizontal axis of rotation, and a third driving means connected to the other end of said rocker lever for rotating the same and lifting or lowering said weight.

5. Lens grinding means comprising, in combination, a lens grinding member, a lens holding member for carrying one or more lenses in grinding relation to said lens grinding member, a frame, a first shaft mounted on said frame for rotation about a vertical axis with one of said members mounted on its upper end for rotation therewith, a first driving means for rotating said first shaft about said vertical axis, poker rod means connected to and extending upwardly from the other of said members, a poker rod support arm secured at its distal end to the upper end of said poker rod means, a horizontal shaft at the other end of said support arm mounting said support arm for rotation about a horizontal axis, a second shaft mounted on said frame for rotation about a vertical axis and rotatably carrying said horizontal shaft whereby said support arm and said poker rod means carried thereby are movable simultaneously about horizontal and vertical axes, a second driving means connected to said horizontal shaft for arcuately reciprocating it about the vertical axis of said second shaft, an elongated roller rotatably mounted on the upper side of said support arm and extending longitudinally thereof at said distal end, a rocker lever mounted on said frame above said support arm for rotation intermediate its ends about a horizontal axis, an elongated roller rotatably mounted on the under side and at one end and transversely of said rocker lever and engaging said roller on said support arm in any position to which said support arm is reciprocated, weight means on said one end of said rocker lever and movable therewith only about its horizontal axis of rotation, a third driving means connected to the other end of said rocker lever for rotating the same and lifting or lowering said weight, and means loosely interconnecting said rocker lever and said support arm to lift the latter and said poker rod means when said weight means is lifted.

6. Lens grinding means comprising, in combination, a lens grinding member, a lens holding member for carrying one or more lenses in grinding relation to said lens grinding member, a frame, a first shaft mounted on said frame for rotation about a vertical axis with one of said members mounted on its upper end for rotation therewith, a first driving means for rotating said first shaft about said vertical axis, poker rod means connected to and extending upwardly from the other of said members, a poker rod support arm secured at its distal end to the upper end of said poker rod means, a horizontal shaft at the other end of said support arm mounting said support arm for rotation about a horizontal axis, a second shaft mounted on said frame for rotation about a vertical axis and rotatably carrying said horizontal shaft whereby said support arm and said poker rod means carried thereby are movable simultaneously about horizontal and vertical axes, a second driving means connected to said horizontal shaft for arcuately reciprocating it about the vertical axis of said second shaft, an elongated roller rotatably mounted on the upper side of said support arm and extending longitudinally thereof at said distal end, a rocker lever mounted on said frame above said support arm for rotation intermediate its ends about a horizontal axis, an elongated roller rotatably mounted on the under side and at one end and transversely of said rocker lever and engaging said roller on said support arm in any position to which said support arm is reciprocated, weight means on said one end of said rocker lever and movable therewith only about its horizontal axis of rotation, a third driving means connected to the other end of said rocker lever for rotating the same and lifting or lowering said weight, and control means for the several driving means for effecting operation of said first and second driving means to rotate said first shaft and oscillate said support arm to effect a combined relative rotary and reciprocatory movement of said lens grinding and lens holding members to grind the surface of said one or more lenses and for effecting operation of said third driving means to swing said weight means downwardly and engage said rollers with said weight means moving in a vertical plane and urging said lens grinding member and the lens or lenses on said lens holding member into mutual grinding engagement.

7. Lens grinding means comprising, in combination, a lens grinding member, a lens holding member for carrying one or more lenses in grinding relation to said lens grinding member, a frame, a first shaft mounted on said frame for rotation about a vertical axis with one of said members mounted on its upper end for rotation therewith, a first driving means for rotating said first shaft about said vertical axis, poker rod means connected to and extending upwardly from the other of said members, a poker rod support arm secured at its distal end to the upper end of said poker rod means, a horizontal shaft at the other end of said support arm mounting said support arm for rotation about a horizontal axis, a second shaft mounted on said frame for rotation about a vertical axis and rotatably carrying said horizontal shaft whereby said support arm and said poker rod means carried thereby are movable simultaneously about horizontal and vertical axes, a second driving means connected to said horizontal shaft for arcuately reciprocating it about the vertical axis of said second shaft, an elongated roller rotatably mounted on the upper side of said support arm and extending longitudinally thereof at said distal end, a rocker lever mounted on said frame above said support arm for rotation intermediate its ends about a horizontal axis, an elongated roller rotatably mounted on the under side and at one end and transversely of said rocker lever and engaging said roller on said support arm in any position to which said support arm is reciprocated, weight means on said one end of said rocker lever and movable therewith only about its horizontal axis of rotation, a third driving means connected to the other end of said rocker lever for rotating the same and lifting or lowering said weight, control means for the several driving means for effecting operation of said first and second driving means to rotate said first shaft and oscillate said support arm to effect a combined relative rotary and reciprocatory movement of said lens grinding and lens holding members to grind the surface of said one or more lenses and for effecting operation of said third driving means to swing said weight means downwardly and engage said rollers with said weight means moving in a vertical plane and urging said lens grinding member and the lens or lenses on said lens holding member into mutual grinding engagement, and timing means connected to said control means for operating the same a predetermined time after initiation thereof to stop rotation of said first shaft and oscillation of said support and to rotate said rocker lever and raise said weight means to permit removal and replacement of said lens or lenses.

8. Lens grinding means comprising, in combination, a lens grinding member, a lens holding member for carrying one or more lenses in grinding relation to said lens grinding member, a frame, a first shaft mounted on said frame for rotation about a vertical axis with one of said members mounted on its upper end for rotation therewith, a first driving means for rotating said first shaft about said vertical axis, poker rod means connected to and extending upwardly from the other of said members, a poker rod support arm secured at its distal end to the upper end of said poker rod means, a horizontal shaft at the other end of said support arm mounting said support arm for rotation about a horizontal axis, a second shaft mounted on said frame for rotation about a vertical axis and rotatably carrying said horizontal shaft whereby said support arm and said poker rod means carried thereby are movable simultaneously about horizontal and vertical axes, a second driving means connected to said horizontal shaft for arcuately reciprocating it about the vertical axis of said second shaft, an elongated roller rotatably mounted on the upper side of said support arm at said distal end, a rocker lever mounted on said frame above said support arm for rotation about a horizontal axis, an elongated roller rotatably mounted on the under side and at one end of said rocker lever transversely of and engaging said roller on said support arm in any position to which said support arm is reciprocated, weight means adjustably longitudinally mounted on said one end of said rocker lever toward and away from the pivot axis thereof and movable therewith only about its horizontal axis of rotation, and a third driving means connected to the other end of said rocker lever for rotating the same and lifting or lowering said weight means.

9. Lens grinding means comprising, in combination, a lens grinding member, a lens holding member for carrying one or more lenses in grinding relation to said lens grinding member, a frame, a first shaft mounted on said frame for rotation about a vertical axis with one of said members mounted on its upper end for rotation therewith, a first driving means for rotating said first shaft about said vertical axis, poker rod means connected to and extending upwardly from the other of said members, a poker rod support arm secured at its distal end to the upper end of said poker rod means, a horizontal shaft at the other end of said support arm mounting said support arm for rotation about a horizontal axis, a second shaft mounted on said frame for rotation about a vertical axis and rotatably carrying said horizontal shaft whereby said support arm and said poker rod means carried thereby are movable simultaneously about horizontal and vertical axes, a second driving means connected to said horizontal shaft for arcuately reciprocating it about the vertical axis of said second shaft, an elongated roller rotatably mounted on the upper side of said support arm at said distal end, a rocker lever mounted on said frame above said support arm for rotation about a horizontal axis, an elongated roller rotatably mounted on the under side at one end of said rocker lever transversely of and engaging said roller on said support arm in any position to which said support arm is reciprocated, weight means adjustably longitudinally mounted on said one end of said rocker lever toward and away from the pivot axis thereof and movable therewith only about its horizontal axis of rotation, a third driving means connected to the other end of said rocker lever for rotating the same and lifting or lowering said weight means, and control means for the several driving means for effecting operation of said first and second driving means to rotate said first shaft and oscillate said support arm to effect a combined relative rotary and reciprocatory movement of said lens grinding and lens holding members to grind the surface of said one or more lenses and for effecting operation of said third driving means to swing said weight means downwardly and engage said rollers with said weight means moving in a vertical plane and urging said lens grinding member and the lens or lenses on said lens holding member into mutual grinding engagement.

10. Lens grinding means comprising, in combination, a lens grinding member, a lens holding member for carrying one or more lenses in grinding relation to said lens grinding member, a frame, a first shaft mounted on said frame for rotation about a vertical axis with one of said members mounted on its upper end for rotation therewith, a first driving means for rotating said first shaft about said vertical axis, poker rod means connected to and extending upwardly from the other of said members, a poker rod support arm secured at its distal end to the upper end of said poker rod means, a horizontal shaft at the other end of said support arm mounting said support arm for rotation about a horizontal axis, a second shaft mounted on said frame for rotation about a vertical axis and rotatably carrying said horizontal shaft whereby said support arm and said poker rod means carried thereby are movable simultaneously about horizontal and vertical axes, a second driving means connected to said horizontal shaft for arcuately reciprocating it about the vertical axis of said second shaft, an elongated roller rotatably mounted on the upper side of said support arm at said distal end, a rocker lever mounted on said frame above said support arm for rotation about a horizontal axis, an elongated roller rotatably mounted on the under side and at one end of said rocker lever transversely of and engaging said roller on said support arm in any position to which said support arm is reciprocated, weight means adjustably longitudinally mounted on said one end of said rocker lever toward and away from the pivot axis thereof and movable therewith only about its horizontal axis of rotation, a third driving means connected to the other end of said rocker lever for rotating the same and lifting or lowering said weight means, control means for the several driving means for effecting operation of said first and second driving means to rotate said first shaft and oscillate said support arm to effect a combined relative rotary and reciprocatory movement of said lens grinding and lens holding members to grind the surface of said one or more lenses and for effecting operation of said third driving means to swing said weight means downwardly and engage said rollers with said weight means moving in a vertical plane and urging said lens grinding member and the lens or lenses on said lens holding member into mutual grinding engagement, and timing means connected to said control means for operating the same a predetermined time after initiation thereof to stop rotation of said first shaft and oscillation of said support and to rotate said rocker lever and raise said weight means to permit removal and replacement of said lens or lenses.

11. Lens grinding means comprising, in combination, a lens grinding member, a lens holding member for carrying one or more lenses in grinding relation to said lens grinding member, a frame, a first shaft mounted on said frame for rotation about a vertical axis with one of said members mounted on its upper end for rotation therewith, a first driving means for rotating said first shaft about said vertical axis, poker rod means connected to and extending upwardly from the other of said members, a poker rod support arm secured at its distal end to the upper end of said poker rod means, a horizontal shaft at the other end of said support arm mounting said support arm for rotation about a horizontal axis, a second shaft mounted on said frame for rotation about a vertical axis and rotatably carrying said horizontal shaft whereby said support arm and said poker rod means carried thereby are movable simultaneously about horizontal and vertical axes, a second driving means connected to said horizontal shaft for arcuately reciprocating it about the vertical axis of said second shaft, an elongated roller rotatably mounted on the upper side of said support arm and extending longitudinally centrally thereof at said distal end, a rocker lever mounted on said frame above said support arm for rotation intermediate its ends about a horizontal axis, an elongated roller rotatably mounted on the under side and at one end and transversely of said rocker lever and engaging said roller on said support arm in any position to which said support arm is reciprocated, a weight adjustably longitudinally mounted on said one end of said rocker lever toward and away from the pivot axis thereof and movable therewith only about its horizontal axis of rotation, a third driving means connected to the other end of said rocker lever for rotating the same and lifting or lowering said weight, means loosely interconnecting said rocker lever and said support arm to lift the latter and said poker rod means when said weight is lifted, control means for the several driving means for effecting operation of said first and second driving means to rotate said first shaft and oscillate said support arm to effect a combined relative rotary and reciprocatory movement of said lens grinding and lens holding members to grind the surface of said one or more lenses and for effecting operation of said third driving means to swing said weight downwardly and engage said rollers with said weight moving in a vertical plane and urging said lens grinding member and the lens or lenses on said lens holding member into mutual grinding engagement, and timing means connected to said control means for operating the same a predetermined time after initiation thereof to stop rotation of said first shaft and oscillation of said support and to rotate said rocker lever and raise said weight together with said support arm to permit removal and replacement of said lens or lenses.

12. The invention, as set forth in claim 11, wherein the lens holding member is mounted on and rotates with the first shaft.

13. In a lens grinding machine, a pair of co-operating lens holding and grinding members, a vertical spindle for rotating one of the members at the upper end thereof, a poker rod pivotally carrying the other member above and in engagement with said one of the members, an arm carrying the rod at one end thereof, means mounting the other end of the arm for limited universally pivotal movement, a weight, means mounting the weight above the arm for movement in a vertical plane only, means for oscillating the arm about a vertical axis, and means connecting the weight and the arm to apply the weight to the arm and permit movement of the arm horizontally relative to the weight.

14. The lens grinding machine of claim 13 wherein the connecting means includes first roller means supporting the weight and second roller means connected to the arm and supporting the first roller means, the second roller means extending generally transversely of the first roller means.

References Cited in the file of this patent

UNITED STATES PATENTS

| | | |
|---|---|---|
| 621,181 | Thompson | Mar. 14, 1899 |
| 775,258 | Thompson | Nov. 15, 1904 |
| 2,715,803 | Bronson | Aug. 23, 1955 |